(12) United States Patent
Färber

(10) Patent No.: US 10,770,815 B2
(45) Date of Patent: Sep. 8, 2020

(54) CHARGING COLUMN FOR AN ELECTRIC VEHICLE AND ELECTRIC VEHICLE

(71) Applicant: AUDI AG, Ingolstadt (DE)

(72) Inventor: Ingo Färber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 88 days.

(21) Appl. No.: 16/177,663

(22) Filed: Nov. 1, 2018

(65) Prior Publication Data

US 2019/0135124 A1 May 9, 2019

(30) Foreign Application Priority Data

Nov. 7, 2017 (DE) .................. 10 2017 219 736

(51) Int. Cl.
| | |
|---|---|
| H01R 13/00 | (2006.01) |
| B60L 53/31 | (2019.01) |
| B60L 53/66 | (2019.01) |
| B60L 58/27 | (2019.01) |
| B60L 53/14 | (2019.01) |
| B60L 58/26 | (2019.01) |
| B60L 53/10 | (2019.01) |

(52) U.S. Cl.
CPC ............ *H01R 13/005* (2013.01); *B60L 53/11* (2019.02); *B60L 53/14* (2019.02); *B60L 53/31* (2019.02); *B60L 53/665* (2019.02); *B60L 58/26* (2019.02); *B60L 58/27* (2019.02); *B60L 2230/12* (2013.01); *B60L 2230/22* (2013.01); *B60L 2240/545* (2013.01)

(58) Field of Classification Search
CPC ........ B60L 53/14; B60L 53/31; B60L 53/666; B60L 58/26; B60L 58/27; H01M 10/625; B60H 1/00257

USPC .................................................. 320/109, 150
See application file for complete search history.

(56) References Cited

U.S. PATENT DOCUMENTS

| | | | |
|---|---|---|---|
| 2009/0256523 A1 | 10/2009 | Taguchi | |
| 2012/0318783 A1 | 12/2012 | Kamachi | |
| 2013/0029193 A1 | 1/2013 | Dyer et al. | |
| 2013/0030622 A1* | 1/2013 | Park ...................... | B60K 6/46 701/22 |

(Continued)

FOREIGN PATENT DOCUMENTS

| | | |
|---|---|---|
| DE | 195 30 609 A1 | 2/1997 |
| DE | 10 2010 007 975 A1 | 8/2011 |

(Continued)

OTHER PUBLICATIONS

Examination Report dated Feb. 26, 2020 in corresponding German Application No. 10 2017 219 736.6; 17 pages including partial machine-generated English-language translation.

(Continued)

*Primary Examiner* — Paul Dinh
(74) *Attorney, Agent, or Firm* — Maier & Maier, PLLC

(57) ABSTRACT

A charging column for an electric vehicle includes a charging plug for recharging the electric vehicle; a media plug that can be connected to the electric vehicle for removing heat from a vehicle-side temperature-control circuit of the electric vehicle with the cycling of a cooling medium that can be introduced and removed by the media plug.

Heat can also be introduced to the electric vehicle by the media plug with the cycling of a heating medium that can be introduced and discharged by the media plug.

10 Claims, 1 Drawing Sheet

(56) References Cited

U.S. PATENT DOCUMENTS

| | | | |
|---|---|---|---|
| 2014/0109872 A1* | 4/2014 | Porras | B60H 1/034 |
| | | | 123/435 |
| 2015/0306974 A1* | 10/2015 | Mardall | H01M 10/625 |
| | | | 320/150 |
| 2017/0096073 A1 | 4/2017 | Mardall et al. | |
| 2017/0355245 A1* | 12/2017 | Bergweiler | B60H 1/00257 |
| 2018/0086177 A1* | 3/2018 | Agathocleous | B60L 53/14 |
| 2018/0304757 A1* | 10/2018 | Vaughan | B60L 53/14 |

FOREIGN PATENT DOCUMENTS

| | | |
|---|---|---|
| DE | 102011003436 A1 | 8/2012 |
| DE | 102012220218 A1 | 5/2014 |
| DE | 112012003099 T5 | 7/2014 |
| DE | 102016004851 A1 | 12/2016 |
| DE | 10 2015 222 703 A1 | 5/2017 |
| FR | 2 934 087 A3 | 1/2010 |
| JP | 2013134033 A | 7/2013 |
| WO | 2013/019336 A1 | 2/2013 |

OTHER PUBLICATIONS

Search Report dated Oct. 16, 2018 in corresponding German Application No. 10 2017 219 736.6; 15 pages including partial machine-generated English-language translation.

Search Report dated Feb. 14, 2020 in corresponding European Application No. 18 200 307.9; 10 pages including partial machine-generated English-language translation.

The extended European search report dated Mar. 6, 2019 of corresponding European application No. 18200307.9 including partial machine-generated English language translation; 9 pgs.

European Office Action dated May 7, 2020, in connection with corresponding EP Application No. 18 200 307.9 (6 pgs., including machine-generated English translation).

\* cited by examiner

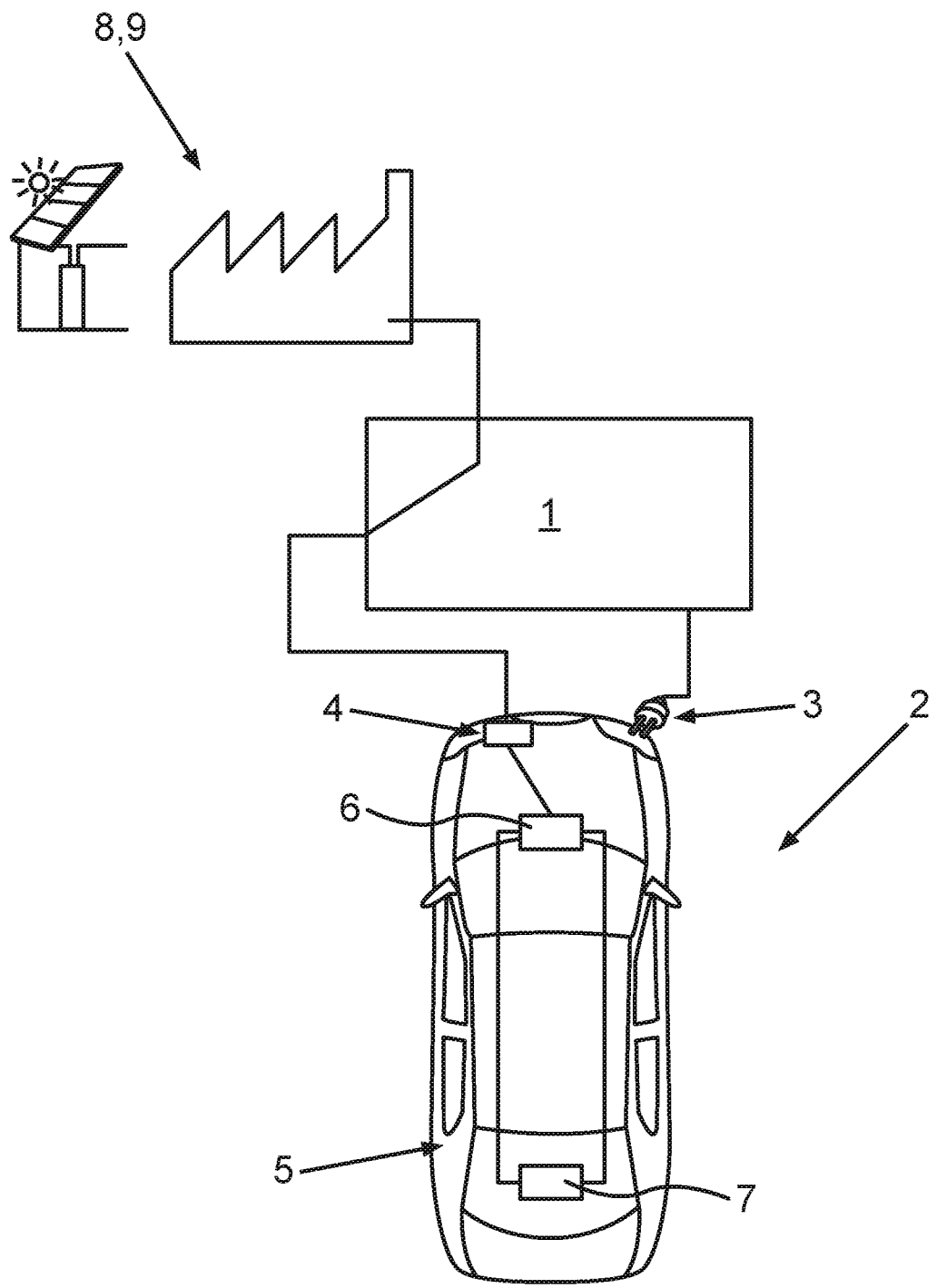

CHARGING COLUMN FOR AN ELECTRIC VEHICLE AND ELECTRIC VEHICLE

FIELD

The invention relates to a charging column for an electric vehicle, and an electric vehicle for connection to such a charging column.

BACKGROUND

Currently, charging columns or charging stations are usually used exclusively for the recharging of electric vehicles. The recharging of these types of electric vehicles takes a certain amount of time, during which the electric vehicle being recharged cannot be driven. During the charging process, electric vehicles are frequently subjected to diverse environmental influences, including among others, a particular ambient temperature. Usually, a battery being recharged heats up during the charging process, wherein other electrical or electronic components of the electric vehicle may also heat up. Frequently, vehicle systems such as batteries and miscellaneous electronic systems in the passenger compartment are placed in a thermally non-optimal state, in particular, during a charging process of an electric vehicle at a charging column.

Particularly rapid charging and discharging times in high-performance electric vehicles can usually also be realized only by a sophisticated heat management of batteries and power electronics belonging to them, and battery cells are cooled, in particular.

Furthermore, electric vehicles also have a strong temperature dependence. At low temperatures, for example, the driving range of an electric vehicle decreases, whereas higher temperatures particularly accelerate the aging of batteries, and at higher temperatures, damage of battery cells may also occur.

Therefore, basically, a relatively homogeneous and favorable temperature distribution in battery packs or batteries of electric vehicles would be desirable.

In order to achieve a heat management that is as ideal as possible during a charging process of an electric vehicle, often a portion of the electrical charging current available must be utilized for temperature control of the affected batteries, so that this portion of the charging current can no longer be used for the actual recharging of the battery. In other words, a portion of the connected power of the charging column affected is consumed therefor.

Of course, the respective connected power that energy suppliers can provide by way of the power grid is usually limited. Thus, if the connected power that is available is used for the temperature control of a battery of an electrical vehicle, the charging power will be automatically limited thereby.

It is basically well known to discharge excess heat during charging processes of electric vehicles. Thus, for example, DE 10 2016 004 851 A1, JP 2013134033 A, DE 10 2012 220 218 A1 and DE 11 2012 003 099 T5 show respective solutions for discharging heat from a battery of an electric vehicle during a charging process.

Moreover, DE 10 2011 003 436 A1 shows a container for accommodating a charging station that can be sunk in the ground for recharging an electric vehicle. In this case, a side wall of the container can serve as wall or floor heating for a room of a building in which adjacent containers can be disposed.

SUMMARY

It is the object of the present invention to provide a solution by means of which electric vehicles can be temperature-controlled and recharged in a particularly efficient way.

This object is achieved by a charging column for an electric vehicle and by an electric vehicle designed to connect to a charging column of this type, having the features of the independent patent claims. Advantageous embodiments with appropriate and non-trivial enhancements of the invention are indicated in the dependent claims.

The charging column for an electric vehicle according to the invention comprises a charging plug for recharging the electric vehicle and a media plug that can be connected to the electric vehicle for discharging heat from a temperature-control circuit of the electric vehicle on the side of the vehicle with the cycling of a cooling medium that can be introduced and discharged by means of the media plug. The charging column according to the invention in this case is characterized in that heat can also be introduced to the electric vehicle by means of the media plug with the cycling of a heating medium that can be introduced and discharged by means of the media plug. The charging plug can be understood very generally as an interface, by way of which electrical energy can be introduced into the electric vehicle. The media plug can be understood very generally as an interface, by means of which media can be introduced into the electric vehicle and can also be removed again from the electric vehicle.

The charging column according to the invention thus broadens the heat management of an electric vehicle in the direction of heating and cooling of respective vehicle systems that are thermally coupled to said temperature-control circuit of the electric vehicle. Preferably, the charging column has at least one interface for connecting the charging column to at least one supplier of heat, as well as an interface for connecting the charging column to at least one supplier of cold. Thus, for example, in the winter, heat can be introduced by way of an external supplier of heat, for example, in order to keep a traction battery of the electric vehicle in an optimal temperature range, or to bring it into an optimal temperature range. It is, of course, also possible as well to introduce said cooling medium by way of the media plug, for example, in order to discharge excess heat from a battery of the electric vehicle during a battery charging process.

The connected electrical power of the charging column concerned can either be reduced or completely used up for the recharging of a battery of the electric vehicle, since the temperature control of the electric vehicle takes place purely by way of the introduction and discharge of the cooling medium or of the heating medium through the media plug. Also, a particularly sophisticated heat management of the electric vehicle can be produced by means of the charging column, in that the electric vehicle and components belonging thereto are heated or cooled as necessary.

In particular, the necessary charging time can be reduced, as needed, by a targeted heating or cooling of the electric vehicle, respectively. Consequently, the occupancy time of the charging column can also be reduced.

In particular, the invention is based on the knowledge that the heat or cold is produced with alternative technologies that are absolutely more economical than with electrical current, and also usually have a better energy balance. An example of this is combined cooling, heat, and power, also known as CCHP and trigeneration. Here, the heat generated by a block-type thermal power station, a thermal solar array, or a geothermal plant is used for the operation of an adsorption chiller for air conditioning. In addition, there are several possibilities for cold production, such as cold generation with thermal systems and cold generation with thermomechanical systems.

The charging column preferably provides said interfaces for the connection of the charging column to a supplier of heat and to a supplier of cold. Basically, the charging column can be connected to the most varied cold sources or heat sources, so that said cooling medium or said heating medium can be introduced for temperature control of the electric vehicle and can then be removed again from the vehicle.

For example, it is also possible that the charging column involves a private charging column at a private parking space or a private garage. By connecting the media plug to the electric vehicle, for example, in the winter, the electric vehicle can be warmed up independently from a supply of electrical current, so that, for example, a passenger compartment of the electric vehicle and a battery of the electric vehicle can each be optimally temperature-controlled, and in fact, this can be done without consuming electrical current. Of course, a procedure of this type is also possible in the case of commercial charging columns in the public space.

An advantageous embodiment of the invention provides that the charging column is equipped for the purpose of removing heat from the temperature-control circuit or introducing heat to the temperature-control circuit independently from a charging process of the electric vehicle. The recharging of a battery of the electric vehicle can thus be carried out completely decoupled from a temperature control of the electric vehicle. Even if the electric vehicle is not being directly recharged by means of the charging column, it is possible to remove heat from the vehicle-side temperature-control circuit or to introduce heat to the temperature-control circuit of the electric vehicle by way of the media plug plugged into the electric vehicle. Thus, for example, after concluding a charging process, it is possible to control the temperature of a passenger compartment of the electric vehicle—for example, to control it in the case of particularly low ambient temperatures, or to keep it in an already temperature-controlled state, and to do so without consuming electrical current. If the charging column has several charging plugs, for example, then the entire charging power of the charging column can be used for recharging another electric vehicle, while the previously recharged electric vehicle is additionally temperature-controlled.

In another advantageous embodiment of the invention, it is provided that the charging column is equipped for the purpose of removing heat from the temperature-control circuit or introducing heat to the temperature-control circuit as a function of an external temperature and a temperature of at least one component of the electric vehicle that is thermally coupled to the temperature-control circuit. For this, the charging column may have, for example, a control that is coupled to the most diverse sensors that are on the vehicle side and are external to the vehicle. The control of the charging column can introduce or discharge a heating medium or also a cooling medium, as needed, as a function of corresponding sensor data relative to the external temperature and the temperature of the most diverse components of the electric vehicle, in order to precisely control the temperature of the most diverse components of the electric vehicle. Without the intervention of a user of the electric vehicle, the electric vehicle, in particular, a battery of the electric vehicle, or also a passenger compartment of the electric vehicle, can thus be optimally temperature-controlled before, during and/or after a charging process.

According to another advantageous embodiment of the invention, it is provided that the charging column has a payment interface for payment of the heat that is introduced and discharged. Thus, commercial operators of the charging column can also get paid in a simple way for the heat that is introduced and discharged. For example, it is possible to directly pay and get paid by credit card, by EC card, via Paypal or also by way of any other payment method for the delivered or discharged heat The electric vehicle according to the invention is designed for connecting to the charging column according to the invention or to an advantageous embodiment of the charging column according to the invention, wherein the electric vehicle has a charging interface for the charging plug of the charging column, at least one temperature-control circuit, and a media interface for the media plug of the charging column for the discharge of heat from the temperature-control circuit of the electric vehicle as well as for the introduction of heat into the temperature-control circuit of the electric vehicle.

An advantageous embodiment of the electric vehicle according to the invention provides that the electric vehicle has a heat exchanger for the exchange of heat between the temperature-control circuit on the vehicle side and the cooling medium and the heating medium that can be introduced as well as removed by means of the media plug. Heat can be introduced into the temperature-control circuit or can be removed from said circuit in a particularly simple way thereby. Preferably, the heat exchanger is designed as a recuperator; thus, it possesses a separate space for a medium of the temperature-control circuit and for the cooling media or heating media, respectively, that can be introduced as well as removed by means of the media plug. A fluid of the temperature-control circuit thus never comes into contact with the cooling media or heating media, respectively, that can be introduced as well as removed. This is advantageous particularly when the vehicle-side temperature-control circuit contains a fluid that is different than the cooling medium and heating medium.

Finally, another advantageous embodiment of the electric vehicle according to the invention provides that the temperature-control circuit has an inlet for introducing the cooling medium and heating medium as well as an outlet for discharging the cooling medium and heating medium. In particular, it is also possible in this case that said heat exchanger is omitted, so that the cooling medium or heating medium concerned, respectively, is introduced directly into the temperature-control circuit of the electric vehicle and can again be discharged from the latter. In this way, there results a particularly simple design for the temperature control of the temperature-control circuit of the electric vehicle and thus for the temperature control of the affected components of the electric vehicle.

Other advantages, features and details of the invention result from the following description of a preferred example of embodiment and based on the drawing. The features and combinations of features named above in the preceding description, as well as the features and combinations of features named below in the description of the FIGURE and/or features and combinations of features shown in the FIGURE alone can be used not only in the combination indicated in each case, but also in other combinations or standing alone, without departing from the scope of the invention.

BRIEF DESCRIPTION OF THE DRAWING

In FIG. 1, in a very schematized representation, the drawing shows an electric vehicle that is connected to a charging column, wherein, on the one hand, a charging plug is connected for recharging the electric vehicle, and, on the other hand, a media plug is connected for temperature control of the electric vehicle.

In each case, functionally equivalent elements are provided with the same reference numbers in the FIGURES*.

DETAILED DESCRIPTION

A charging column 1, to which an electric vehicle 2 is connected, is shown in a very schematized representation in the single FIGURE. The charging column 1 has a charging plug 3 for recharging the electric vehicle 2. In addition, the charging column 1 has a media plug 4, by way of which the electric vehicle 2 can be temperature-controlled. By means of the media plug 4, on the one hand, heat from a vehicle-side temperature-control circuit 5 can be discharged, and, on the other hand, heat can also be introduced into the temperature-control circuit 5 of the electric vehicle 2. It is thus possible that electric vehicle 2 can be both cooled as well as heated by way of the media plug 4.

A heat exchanger 6 as well as at least one component 7 are integrated into the vehicle-side temperature-control circuit 5. Component 7 may involve, for example, a battery of the electric vehicle 2, which is coupled thermally to the temperature-control circuit 5 and can be recharged by plugging in the charging plug 3. Unlike in the presently very schematized representation, it is also possible, of course, that a plurality of other components are also coupled to the temperature-control circuit 5.

The charging column 1 preferably has several interfaces for connecting charging column 1 to different heat suppliers 8 and cold suppliers 9. Therefore, the charging column 1 can be coupled, for example, to a combined cooling, heat, and power plant, abbreviated as CCHP and also known as a trigeneration plant. The charging column 1 can also be connected to a nearby or remote heating network. The charging column 1 can also be connected in the same way to a nearby or remote cold network. Likewise, it is possible that the charging column 1 is coupled to an air-conditioning system of a single-family or multi-family house. Also, the charging column 1 can be connected to an air-conditioning system of public buildings.

The electric vehicle 2 is designed for connecting to the charging column 1, and, in particular, comprises a charging interface, which is not shown in more detail here, for accommodating the charging plug 3, as well as a media interface, which is also not shown in more detail, for accommodating the media plug 4. Unlike in the present representation, it is also possible that the charging plug 3 and the media plug 4 are designed in the form of a single plug, in which the respective media and electrical current connections are integrated. In this case then, only a single plug needs to be plugged into the electric vehicle 2, both to recharge the electric vehicle 2 and also to introduce heat into the electric vehicle 2 or to remove it therefrom.

The charging column 1 is particularly equipped also for the purpose of discharging heat from the temperature-control circuit 5 or introducing heat to the temperature-control circuit 5, independently from a charging process of the electric vehicle 2. For example, it is possible, even before an actual recharging process of a battery of an electric vehicle 2, by introducing heat, thus by introducing a heating medium by way of the plugged-in media plug 4, to preheat the battery of the electric vehicle 2 to a particularly favorable temperature, at which the battery can be particularly rapidly recharged without damage.

During the actual charging process of the battery, a cooling medium can then be introduced, for example, by way of the media plug 4, in order to discharge excess waste heat from the battery, so that the latter does not overheat during the charging process. Alternatively or additionally, it is also possible, in particular at low ambient temperatures, to additionally utilize the waste heat during the charging process also initially, insofar as possible and necessary, for heating an interior space of the electric vehicle 2, the excess waste heat then first being discharged from the battery by way of the charging column to a corresponding heat supplier or cold supplier 8, 9, respectively, when the passenger compartment has been sufficiently brought to temperature.

After conclusion of the charging process, for example, it is then also still possible, particularly at low external temperatures, in addition, to introduce a suitable heating medium by way of the plugged-in media plug 4, in order to keep warm the passenger compartment of the electric vehicle 2, for example, by way of the vehicle-side temperature-control circuit 5, without electrical current being necessary for this.

Of course, at particularly high external temperatures, it is also possible, independently from an actual charging process, to temperature-control or to cool, respectively, the passenger compartment of the electric vehicle 2 by introduction of a cooling medium by way of the media plug 4. Independently of whether the electric vehicle 2 is cooled or is heated by way of the media plug 4, through the temperature control by way of the fluids concerned, thus, by way of the corresponding cooling media or heating media, respectively, it is assured that the charging power of the charging column 1 is not adversely affected due to the temperature control of the electric vehicle 2. The temperature control of the electric vehicle 2 is provided independently from an introduction of electrical current to the electric vehicle 2, so that the entire charging power of the charging column 1 that is available can be used for the actual recharging of a battery of the electric vehicle 2.

The charging column 1 may also have a payment interface, which is not shown in more detail here, for the payment of heat that is introduced and discharged. For example, the charging column 1 may have a card reading device for credit cards or also for EC cards. Further, for example, it is also possible to carry out a payment with a smart phone by way of a near-field communication. Basically, any payment method is possible via the charging column 1, in order to be able to also take into account the heat that is introduced and discharged.

Said interfaces for connecting charging column 1 to respective heat suppliers 8 and cold suppliers 9 as well as the media plug 4 can also be designed as retrofit modules, which can be retrofitted as assemblies or kits in conventional charging columns. Further, it is also possible that said interfaces and the media plug 4 are integrated into corresponding charging columns 1 in advance, already during their manufacture.

The invention claimed is:

1. A charging column for an electric vehicle, comprising:
a charging plug for recharging the electric vehicle;
a media plug connectable to the electric vehicle for removing heat from a vehicle-side temperature-control circuit of the electric vehicle by cycling a cooling medium that is introduced and discharged by the media plug;

wherein heat is introducible to the electric vehicle by means of the media plug by cycling a heating medium that is introduced and discharged by means of the media plug;

wherein the charging column has at least one interface for connecting the charging column to a heat supplier for supplying heat;

wherein the charging column has at least one interface for connecting the charging column to a cold supplier for supplying cold; and wherein the supplied heat and supplied cold are not generated by way of an electrical current provided at the charging column.

2. The charging column according to claim 1,
wherein the charging column is equipped for the purpose of removing heat from the temperature-control circuit or of introducing heat to the temperature-control circuit, independently from a charging process of the electric vehicle.

3. The charging column according to claim 1,
wherein the charging column is equipped for the purpose of removing heat from the temperature-control circuit or of introducing heat to the temperature-control circuit, as a function of an external temperature and a temperature of at least one component of the electric vehicle that is thermally coupled to the temperature-control circuit.

4. The charging column according to claim 1,
wherein the charging column has a payment interface for payment of the heat that is introduced and removed.

5. An electric vehicle for connecting to a charging column according to claim 1, comprising:
a charging interface for the charging plug, the temperature-control circuit, and
a media interface for the media plug for removing heat from the temperature-control circuit of the electric vehicle as well as for introducing heat into the temperature-control circuit of the electric vehicle.

6. The electric vehicle according to claim 5,
wherein the electric vehicle has a heat exchanger for the exchange of heat between the temperature-control circuit on the vehicle side and the cooling medium and the heating medium that can be introduced as well as removed by the media plug.

7. The electric vehicle according to claim 5,
wherein the temperature-control circuit has an inlet for introducing the cooling medium and heating medium as well as an outlet for discharging the cooling medium and heating medium.

8. The charging column of claim 1,
wherein the heat supplier is one or more of a trigeneration plant, a nearby heating network, or a remote heating network.

9. The charging column of claim 1,
wherein the cold supplier is one or more of a trigeneration plant, a nearby cooling network, a remote cooling network, or an air conditioning system of a building.

10. The charging column of claim 1,
wherein the heat supplier and the cold supplier are disposed at a location that is removed from the location of the charging column.

* * * * *